United States Patent [19]
Dresen et al.
[11] Patent Number: 4,693,507
[45] Date of Patent: * Sep. 15, 1987

[54] TRUCK CARGO BED LINER WITH ANTI-SLIP SURFACE

[75] Inventors: William L. Dresen, Baraboo; William F. Price, Portage; Phillip L. Emery, Portage; Harlan W. Breezer, Portage; Robert R. Holmes, Portage, all of Wis.

[73] Assignee: Penda Corporation, Portage, Wis.

[ * ] Notice: The portion of the term of this patent subsequent to Jun. 3, 2003 has been disclaimed.

[21] Appl. No.: 869,425

[22] Filed: Jun. 2, 1986

Related U.S. Application Data

[63] Continuation-in-part of Ser. No. 608,341, May 8, 1984, Pat. No. 4,592,583.

[51] Int. Cl.[4] .......... B62D 33/02
[52] U.S. Cl. .......... 296/39 R
[58] Field of Search .......... 296/39 R; 106/36; 428/161, 163, 165, 167, 315.5, 33

[56] References Cited

U.S. PATENT DOCUMENTS

| | | | |
|---|---|---|---|
| D. 259,928 | 12/1978 | Weis et al. | D12/98 |
| 3,652,123 | 3/1972 | Speers | 296/39 R |
| 3,814,473 | 6/1974 | Lorenzen, Jr. | 296/39 R |
| 3,881,768 | 5/1975 | Nix | 296/39 R |
| 4,047,749 | 9/1977 | Lambitz et al. | 296/39 R |
| 4,161,335 | 7/1979 | Nix et al. | 296/39 R |
| 4,162,098 | 7/1979 | Richardson, III | 296/39 R |
| 4,181,349 | 1/1980 | Nix et al. | 296/39 R |
| 4,245,863 | 1/1981 | Carter | 296/39 R |
| 4,279,439 | 7/1981 | Cantieri | 296/39 R |
| 4,333,678 | 6/1982 | Munoz et al. | 296/39 R |
| 4,336,963 | 6/1982 | Nix et al. | 296/39 R |
| 4,341,412 | 7/1982 | Wayne | 296/39 R |
| 4,428,306 | 1/1984 | Dresen et al. | 108/53.3 |
| 4,505,508 | 3/1985 | Carter et al. | 296/39 R |
| 4,575,146 | 3/1986 | Markos | 296/39 R |

*Primary Examiner*—Robert R. Song
*Attorney, Agent, or Firm*—Isaksen, Lathrop, Esch, Hart & Clark

[57] ABSTRACT

A pickup truck cargo bed liner is disclosed which is vacuum formed of unitary plastic and adapted to fit within and protect the contours of a pickup truck cargo bed. The liner has a bottom wall, wheel wells, and a front wall and side walls connected to and extending upwardly from the bottom wall, the front wall being connected to the side walls. An elastomer material having an effectively high co-efficient of friction is co-formed with and integrally adhered to the plastic forming the liner to provide an anti-slip surface thereon for restraining movement of cargo on the liner.

10 Claims, 2 Drawing Figures

TRUCK CARGO BED LINER WITH ANTI-SLIP SURFACE

This application is a continuation-in-part of copending application Ser. No. 608,341, filed May 8, 1984, U.S. Pat. No. 4,592,583.

FIELD OF THE INVENTION

This invention relates to molded plastic protective liners for pickup truck cargo beds.

DESCRIPTION OF THE PRIOR ART

Pickup trucks have been used for many years as working vehicles. In recent years pickup trucks have become increasingly popular as family transportation vehicles, because of their dual ability to haul passengers and cargo. The cargo bed surfaces of pickup trucks are generally finished with paint by the manufacturer. If the painted surfaces are unprotected, they can be scratched from cargo impact or deteriorated by weather or corrosives, seriously detracting from the value of the trucks. Whether a pickup truck is used as a working vehicle or as a family transportation vehicle, it is important to keep the surface of the cargo bed in a satisfactory condition.

Various cargo bed liners used to protect the surface of cargo beds are described in prior art patents. One-piece molded plastic truck liners comprising a front wall, opposing side walls and a bottom wall are shown in U.S. Pat. Nos. 4,341,412 to Wayne, 4,336,963 to Nix, et al., 4,181,349 to Nix, et al., 4,047,749 to Lambitz, and 3,814,473 to Lorenzen. All of the above patents show liners with side wall flanges that fit over the side rails of the truck's side walls, with liner side walls extending substantially perpendicularly downward to the liner floor in substantially spaced relation to the side walls of the truck. Most of the above patents show a liner front wall flange which fits over the front rail of the truck front wall.

These and other one-piece molded plastic truck liners have interior surfaces with a relatively low co-efficient of friction which facilitates the sliding of cargo across the bottom wall during loading and unloading of the cargo. However, for some applications, the relatively low friction surface of the bottom wall is a considerable disadvantage because certain types of cargo will slide around quite freely when the truck is accelerating, decelerating and negotiating turns. Such cargo has a tendency to slide to the front of the liner against the liner front wall, with the result that the truck operator must frequently climb into the truck bed and liner to retrieve and unload cargo objects from the truck. This may be particularly inconvenient when the truck is also equipped with a top cap which encloses the cargo bed of the truck, so that the operator must stoop or kneel to move to the front of the cargo area to retrieve and unload an object of cargo.

Therefore, a need has existed to provide a one-piece plastic protective cargo bed liner having a durable, attractive, anti-slip interior surface which allows for efficient shipping and storage, provides optimum cargo space, and can be conveniently installed in pickups fitted with top caps.

SUMMARY OF THE INVENTION

The present invention is summarized in a protective truck bed liner adapted to closely fit the contours of a truck cargo bed and having an integral anti-slip surface.

The truck bed liner has a liner bottom wall adapted to fit on and substantially cover the full width of the truck cargo bed floor, the liner bottom wall having a width substantially as great as the width of the truck rear opening. Two liner wheel wells are formed in the liner bottom wall at opposite sides thereof and adapted to accommodate the truck cargo bed rear wheel wells. A liner front wall is connected to and extends upwardly from the liner bottom wall, the liner front wall having an upper margin adapted to fit snugly against the truck cargo bed front wall. Two liner side walls are connected to the liner bottom wall and wheel wells and the liner front wall at opposite sides thereof, the liner front wall substantially limiting the distance between the liner side walls at the front end of the liner. Each liner side wall projects upwardly from the liner bottom wall and adjacent wheel well and fits snugly against the corresponding truck cargo bed wall. A selected elastomer material having an effective high co-efficient of friction is co-formed with the upper surface of the plastic forming the liner to provide an anti-slip film thereon, the anti-slip film being in the form of an elastomer integrally adhered to the liner upper surface.

It is an object of the present invention to provide a plastic truck cargo liner having an integral, durable anti-slip interior surface.

It is a further object of the present invention to provide a plastic protective truck cargo liner having a bottom wall with a durable, anti-slip, non-tacky surface.

It is a further object of the invention to provide a plastic protective truck cargo liner having an anti-slip film of elastomer integrally adhered to the liner upper surface.

It is an additional object of the invention to provide a plastic protective truck cargo liner having an anti-slip film of elastomer integrally adhered to at least a portion of the liner upper surface in dimensionally stable relation wherein the film has a glossy appearance.

Other objects, advantages and features of the present invention will become apparent from the following description of the preferred embodiment of the invention in conjunction with the accompanying drawings.

DESCRIPTION OF THE PREFERRED EMBODIMENT

Figure 1:
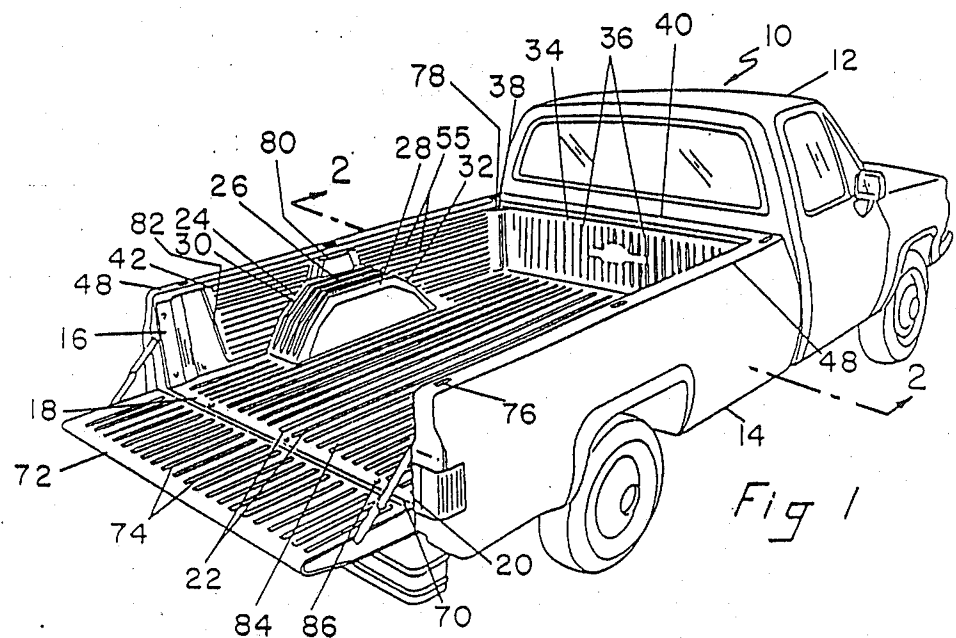
FIG. 1 is a perspective view of a cargo bed liner of the present invention installed in a pickup truck.

FIG. 1 illustrates a conventional pickup truck 10 having a cab 12 and a truck cargo bed 14. A preferred embodiment of the protective truck cargo bed liner 16 of the invention is installed within the truck cargo bed 14.

Figure 2:
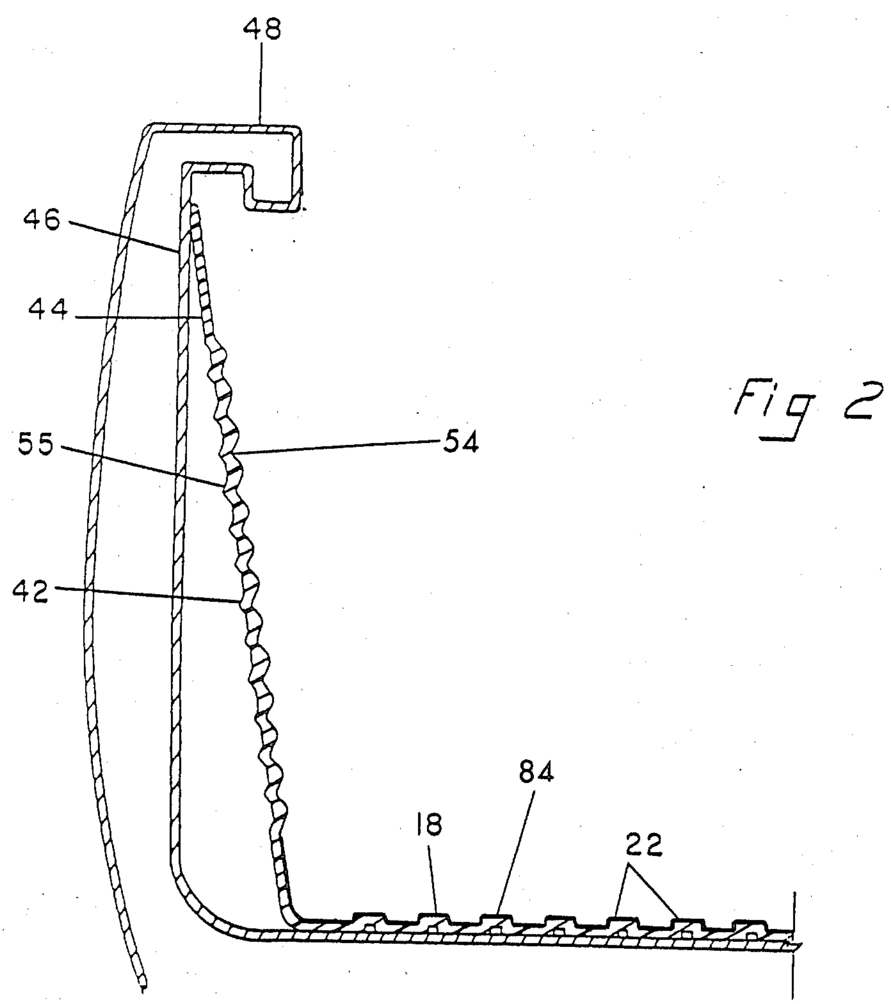
FIG. 2 is a fragmentary sectional view taken substantially along line 2—2 of FIG. 1.

The truck bed liner 16 is formed of high density polyethylene in a single, integral unit, and has a liner bottom wall 18 which is adapted to fit on and substantially cover the full width of the truck cargo bed floor. The liner bottom wall 18 will normally have a width substantially as great as the distance between the truck side rails. As shown in FIG. 2, the liner bottom wall 18 contains a plurality of separate, inverted U-shaped longitudinal corrugations 22. The bottom wall 18 also has a planar apron portion 70 at its rear margin which is adapted to fit snugly against the truck cargo bed floor adjacent the rear access opening 20 to keep foreign material from entering between the liner and the truck bed.

The truck bed liner 16 also has two liner wheel wells 24 formed in the liner bottom wall 18 at opposite sides thereof. The liner wheel wells 24 are adapted to accommodate the truck cargo bed rear wheel wells (not shown). The liner wheel wells 24 have a top wall 26, inside wall 28, and two opposing end walls, one end wall 30 facing backward to the truck rear opening and one end wall 32 facing forward to the cab 12. In the preferred embodiment, the forward-facing end wall 32 is preferably inclined at least approximately 23° from perpendicular for reasons to be described. The inside wall 28 is inclined at an angle of only approximately 2° to 5° from perpendicular to facilitate nesting as more fully described below, while still maximizing the distance between the liner wheel wells to accommodate wide loads.

A liner front wall 34 is connected to and extends upwardly from the liner bottom wall 18. As shown in FIG. 1, the liner front wall 34 preferably contains a plurality of vertically extending corrugations 36 for stability. The liner front wall 34 has an upper margin 38 adapted to fit snugly against the truck cargo bed front wall underneath the truck front rail 40.

Two liner side walls 42 are connected to the liner bottom wall 18 and wheel wells 24 and also the liner front wall 34 at opposite sides thereof. The liner front wall 34 substantially fixes and limits the distance between the liner side walls 42 at the front end of the liner 16. As shown in FIGS. 1 and 2, each liner side wall 42 projects upwardly and outwardly from the liner bottom wall 18 and adjacent liner wheel well 24 at an angle of approximately 5° to 12° from perpendicular. Each liner side wall 42 has a plurality of corrugations 55 for stability and an upper margin 44 which fits snugly against the corresponding truck cargo bed wall 46 beneath the corresponding truck cargo bed side rail 48. The upper margin 44 is preferably substantially co-planar with the liner side wall 42 and devoid of any substantial transverse flange to permit the side wall 42 to fit flush against the cargo bed wall 46, and also to permit the liner side walls 42 to bend outwardly in a limited manner, whereby the spacing of the side walls 42 near the front of the liner will be maintained by the attached front liner wall 34, but more rearwardly portions of the liner side wall 42 will be permitted to open outwardly a limited amount when no restrained within the truck cargo bed to facilitate full nesting of the liner with identical liners. Such limited outward opening of the liner side walls 42 permits use of the more vertical liner wheel well inside walls 28 without sacrificing the full nesting capabilities of the liner, because the inclination of the wheel well inside walls 28 increases as the side walls 42 open outwardly.

It can be seen from FIG. 1 that pick-up cargo beds may have two or three stake channels 76 spaced along each side rail 48, one at each end and sometimes one at the mid-point. These stake channels 76 are typically rectangular steel channels which extend vertically downward from the top of the side rails 48 to the floor of the cargo bed, for the purpose of receiving stakes of wood or other material supporting vertically extending sides for increasing the load-containing capabilities of the truck cargo bed. Because the preferred cargo bed liner 16 extends under the truck side rails 48 all the way to the truck cargo bed side walls, the stake channels 76 would interfere with the liner side walls 42 unless means are provided to accommodate the stake channels 76. The liner side walls 42 intended for use in cargo beds with stake channels 76 each include a front pocket 78, a rear pocket 82, and, if required, a side pocket 80. These side wall pockets 80 extend each side wall 42 inwardly a sufficient distance to permit it to pass around the stake channels 76 while permitting the remainder of the side wall 42 to extend outwardly to engage the truck side wall 46. The configuration of the side wall pockets 78, 80 and 82 may vary, although preferably the pockets are located and shaped to accommodate the differing stake channels of different truck cargo bed manufacturers. As with the liner side wall and wheel well surfaces, it is necessary to incline the surfaces of the pockets to permit full nesting of the liners. Accordingly, inwardly facing surfaces of the front pockets 78 preferably are inclined outwardly at 8° 30" beyond perpendicular. Because of the flexibility of the liner side walls 42, inwardly facing surfaces of the side pockets 80 are only inclined outwardly 2° to 5° beyond perpendicular, and inwardly facing surfaces of the rear pockets 82 may be perpendicular. Front facing surfaces of the side pockets 80 and rear pockets 82, however, preferably incline rearwardly at least 23° beyond perpendicular to permit full nesting of the rearwardly setback nested liners.

The inside surfaces 54 of the cargo bed liner of the present invention are provided with an integral anti-slip, frictional film 84 of material. Such a film of material having a high coefficient of friction will inhibit movement of material placed upon the upper surface of the liner during use. The film 84 may be advantageously provided by laminating the film to the upper surface of the high density polyethylene sheet during extrusion forming of the sheet prior to vacuum forming the liner from the sheet. Suitable materials capable of being bonded to polyethylene and providing such an anti-slip surface include a variety of ethylene ethyl acetate (EEA), ethylene vinyl acetate (EVA), thermoplastic rubber (TPR), Saranex, and a modified polyolefin elastomer sold under the trademark REN-FLEX by the Ren Plastics Company. The film of any of the above materials may also be caused to adhere to the polyethylene surface by use of adhesives or a thermal attachment process before or during the vacuum forming of the liner.

Preferably, a blend of a thermoplastic rubber material sold under the trademark Kraton by the Shell Oil Company, Woodbury, N.J. 08096, and a thermoplastic rubber material sold under the trademark Santoprene by Monsanto Polymers Division of Monsanto Chemical Company, 800 N. Lindbergh, St. Louis, Mo. 63141, may be coextruded as a film of between approximately 10 and 35 thousandths of an inch thickness, such as 25–30 thousandths thick film, on the upper surface of the preferred polyethylene sheet material from which the liner is formed. The preferred blend of Kraton and Santoprene in the film is approximately equal proportions of each, and provides a desirable high co-efficient of friction, without tackiness which might cause undesirable adherence of dust, dirt and other foreign material to the surface and make it difficult to clean. The preferred film also provides a highly desirable low gloos appearance which closely resembles the appearance of the uncoated polyethylene liner. A glossy appearance is desirable and probably commercially necessary because the liner is highly visible when mounted in a pickup truck, and is more attractive and more compatible than a dull, matte finish with the glossy finish of a pickup truck. Finally, the preferred 50–50 blend of Kraton and Santoprene has a shrinkage rate during colling after thermoforming which is sufficiently close to the shrinkage rate of the polyethylene liner material to prevent distortion of the liner or warping and separation of the film from the liner during the cooling stage.

The relative proportions of the preferred Kraton and Santoprene materials may be varied to change the surface characteristics as desired. Generally, Kraton provides tackiness, while Santoprene modifies the tackiness, reduces the amount of shrink and provides the desired gloss or sheen to the film. Accordingly, increasing the proportion of Kraton will produce a tackier, duller finish with a greater amount of shrink after thermoforming, while increasing the proportion of Santoprene decreases the tackiness of the film, provides a glossier finish and makes the shrink rate of the film more similar to that of the polyethylene substrate. The preferred 50–50 proportions produce an attractive, glossy film surface which has a desirable high co-efficient of friction, but is not tacky and does not unduly collect dust, dirt and debris, nor is difficult to clean.

The effectiveness of the preferred anti-slip film 84 was demonstrated as follows: A smooth surface 3700 gm. steel weight was placed on a sheet of polyethylene having a typical grained surface. One side of the sheet was raised to progressively incline the sheet. When the sheet was inclined at an angle of 8° to the horizontal, the steel weight slid on the sheet. The same steel weight was placed on a second similar sheet of polyethylene having a similar typical grained surface, but having the preferred Kraton/Santoprene co-extruded anti-slip elastomer film with glossy finish on the surface. The steel weight did not slide on the sheet until the sheet was inclined at an angle of 15° to the horizontal. The same steel weight was placed on a third similar sheet of polyethylene having a similar typical grained surface, but having a REN-FLEX co-extruded anti-slip elastomer film with a dull and tacky matte finish on the surface. The steel weight did not slide on the sheet until the sheet was inclined at an angle of 15° to the horizontal.

A pickup truck was fitted with a standard polyethylene liner and concrete blocks were placed on the liner bottom wall. The truck was then braked to a stop from a speed of 25 mph and the blocks slid freely to the front of the liner. The truck was then fitted with an identical second polyethylene liner having the preferred Kraton/Santoprene co-extruded anti-slip elastomer film with a glossy finish on the bottom wall surface. Concrete blocks were then placed on the bottom wall surface and the truck was braked to a stop from 25 mph in a similar manner. The blocks did not slide on the bottom wall film covered surface.

As suggested above, the unitary plastic liner 16 is preferably formed in a mold from a sheet of heated polyethylene by a conventional thermoforming process. In that process, the thermoforming vacuum mold is a one-sided mold having vacuum ports provided therein to draw the heated sheet of material against the mold. The polyethylene sheet from which the liner is formed is conventionally made by heating a quantity of pellets of polyethylene until the heated material becomes liquified and of suitable viscosity, extruding the material through an extrusion die and forming rolls which lay the extruded material out in a sheet of desired width and thickness, and cooling the sheet. The cooled sheet is then cut into planar blanks of desired size from which the truck bed liners will be formed.

In carrying out the present invention, a thin film of thermoplastic rubber material as previously described is preferably co-extruded with a polyethylene substrate in a conventional manner to form a sheet of polyethylene having a film of approximately 25 to 30 thousandths inch thick on one side thereof. During such co-extrusion the heated polyethylene substrate material and the similarly heated thermoplastic rubber film material are maintained at proper viscosities in accordance with conventional co-extrusion techniques to cause the materials to flow together evenly and form molecular bonds between the film material and the substrate material.

When a film such as Kraton/Santoprene is used which substantially resembles the substrate sheet material such as polyethylene, it is possible to co-extrude (or laminate during extrusion) the film on less than all of the substrate sheet material, without adverse visual effects. Accordingly, the film 84 may be centered on the substrate sheet and of sufficient width only to cover all portions of the sheet that are formed into the liner bottom wall 18, since the bottom wall 18 is the only portion of the liner on which an anti-slip surface is advantageous. Because portions of the sheet will be drawn in unequal amounts during thermoforming due to irregularities in the liner design, particularly near the corners between the liner front wall 34 and side walls 42, near the liner wheel wells 24, the edges of the film 84 may be quite irregular on the liner 16. If the anti-slip film 84 has the same appearance as the underlying liner inside surface 54, the irregular edge of the film 84 will not be readily visible nor objectionable. Limiting the film 84 to only the width necessary to cover the liner bottom wall 18 will obviously result in material savings and reduction of costs, without loss of effective anti-slip performance.

The preferred liner 16 is installed by simply inserting it into the truck cargo bed 14, positioning the top margins 44 of the side walls 42 snugly against the truck side wall 46 underneath the truck side rail 48, and securing the liner in place by means of fasteners 86. Typically, holes will be drilled through the liner and the cargo bed at several selected locations, and frictional plastic fasteners or metal screws inserted in the holes to secure the liner. Because the liner and fasteners do not engage the truck side rails 48, it is very simple to install the truck liner of the present invention in a truck which has its side rails and cargo bed covered with a top cap.

A separate one-piece tailgate liner 72 may also be attached to the tailgate of the truck in a conventional manner. The tailgate liner 72 has inverted U-shaped, corrugations 74 which are vertically extending when the tailgate is closed. The corrugations 74 are similar to the corrugations 22 of the liner bottom wall. The tailgate liner 72 may also advantageously include the anti-slip, frictional film 84.

While the anti-slip frictional film 84 has been illustrated and described on a preferred plastic truck body liner, it is understood that the anti-slip frictional film of the invention may be incorporated in thermoformed plastic truck bed liners of any desired shape or style.

It is understood that the invention is not confined to the particular construction and arrangement of parts herein illustrated and described, but embraces such modified forms thereof as come within the scope of the following claims.

We claim:

1. A protective truck cargo bed liner of unitary vacuum formed plastic adapted to fit within and protect the contours of a truck cargo bed having a floor, two side walls, a front wall, two rear wheel wells, and a rear access opening, comprising:

a. a liner bottom wall adapted to fit on the truck cargo bed floor;
b. two liner wheel wells formed in the liner bottom wall at opposite sides thereof and adapted to accommodate the truck cargo bed rear wheel wells;
c. a liner front wall connected to and extending upwardly from the liner bottom wall;
d. two liner side walls connected to the liner bottom wall and wheel wells and the liner front wall at opposite sides thereof, each liner side wall projecting upwardly from the liner bottom wall and adjacent wheel well; and
e. a selected elastomeric material having an effectively high co-efficient of friction co-formed with and integrally adhered to the upper surface of the plastic forming the liner to provide an anti-slip film thereon for restraining movement of cargo on the liner.

2. A liner as recited in claim 1, wherein the elastomer film was co-extruded with the plastic forming the liner prior to vacuum forming of the liner and is adhered to the plastic by molecular bonding.

3. A liner as recited in claim 1 wherein the elastomer film was laminated to the plastic forming the liner during extrusion forming of the plastic prior to vacuum forming and is adhered to the plastic by molecular bonding.

4. A liner as recited in claim 1 wherein the elastomer film is adhered to the plastic forming the liner by means of an adhesive applied prior to vacuum forming of the liner and film.

5. A liner as recited in claim 1 wherein the elastomer film is adhered to the plastic forming the liner by a thermal attachment process prior to vacuum forming of the liner.

6. A liner as recited in claim 1 wherein the elastomer film is applied to only a portion of the upper surface of the plastic forming the liner, which portion substantially includes the upper surface of the bottom wall of the liner, with substantial portions of the side walls of the liner not being covered by the elastomer film.

7. A liner as recited in claim 1 which is vacuum formed from a sheet of plastic having the elastomer film adhered to only a portion thereof, the elastomer film substantially covering the plastic forming the bottom wall of the liner.

8. A liner as recited in claim 1 wherein the selected elastomer material has a co-efficient of shrinkage sufficiently similar to that of the plastic forming the liner so that the elastomer film does not warp the plastic or separate therefrom during cooling.

9. A liner as recited in claim 1 wherein the selected elastomer material has a glossy surface appearance.

10. A liner as recited in claim 1 wherein the selected elastomer material has a non-tacky surface.

* * * * *

UNITED STATES PATENT AND TRADEMARK OFFICE

CERTIFICATE OF CORRECTION

PATENT NO. : 4,693,507
DATED : September 15, 1987
INVENTOR(S) : Dresen et al.

It is certified that error appears in the above-identified patent and that said Letters Patent is hereby corrected as shown below:

Title page,
Item [*], Notice, "Jun. 3, 2002" should be -- the expiration date of U.S. Patent No. 4,592,583, issued June 3, 1986. --

Signed and Sealed this

Fifteenth Day of April, 2003

JAMES E. ROGAN
*Director of the United States Patent and Trademark Office*